D. M. BLISS.
ALTERNATING CURRENT RECTIFYING SYSTEM.
APPLICATION FILED JUNE 7, 1912.
1,152,594.
Patented Sept. 7, 1915.
4 SHEETS—SHEET 1.
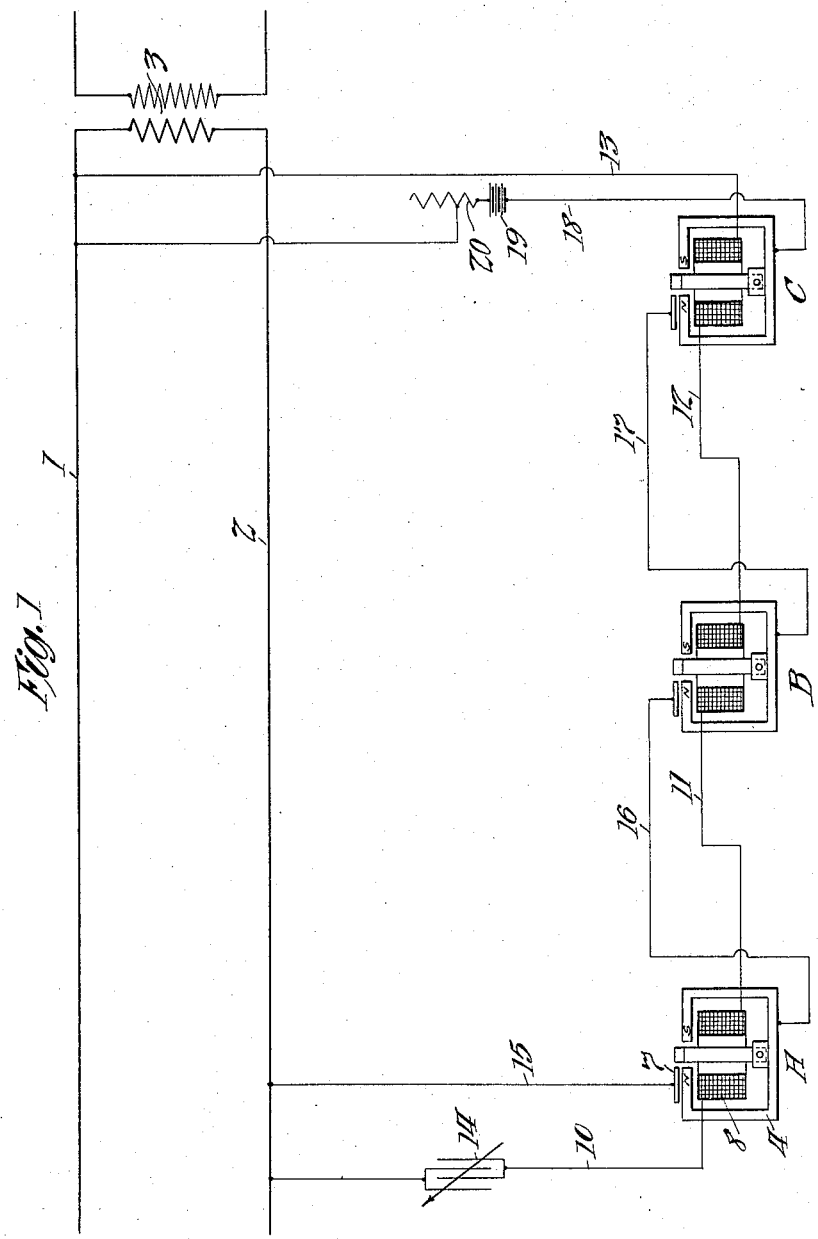
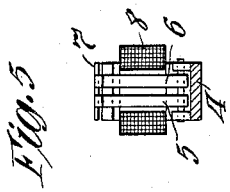
Witnesses:
Inventor:
Donald M. Bliss
by Frank L. Dyer,
his Atty.

D. M. BLISS.
ALTERNATING CURRENT RECTIFYING SYSTEM.
APPLICATION FILED JUNE 7, 1912.
1,152,594.
Patented Sept. 7, 1915.
4 SHEETS—SHEET 2.
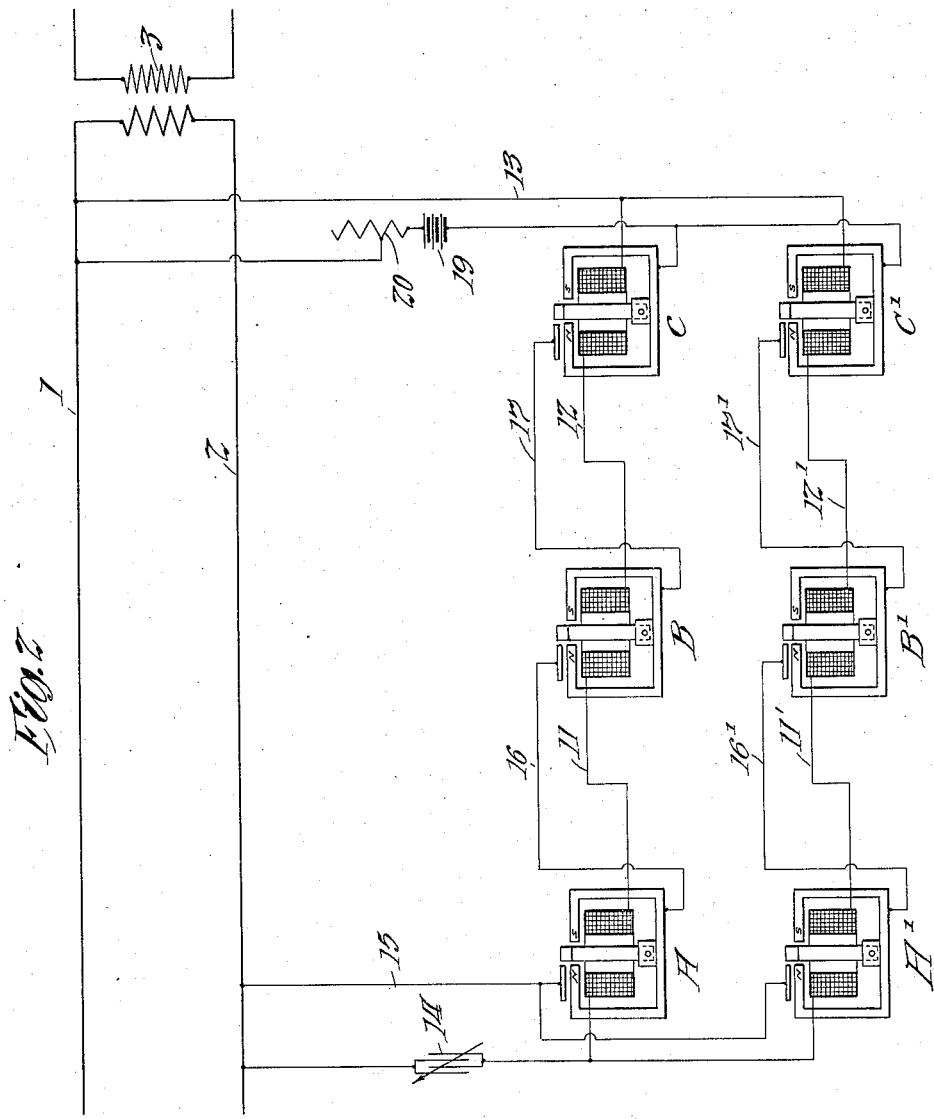

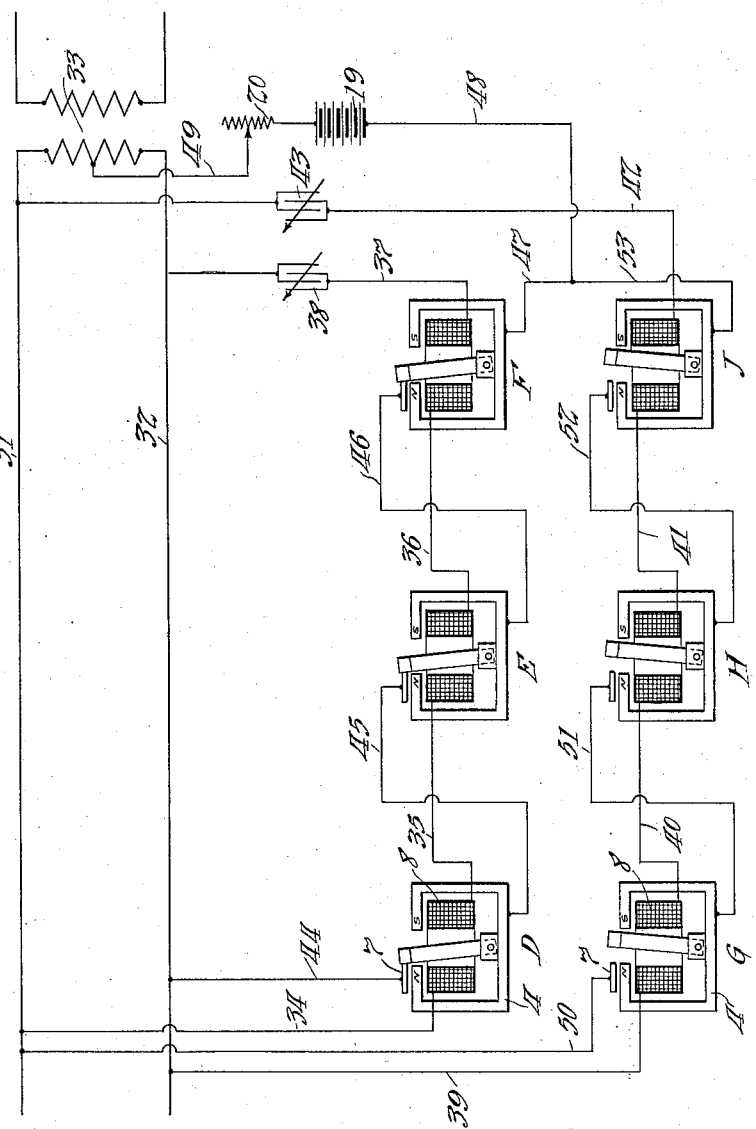

D. M. BLISS.
ALTERNATING CURRENT RECTIFYING SYSTEM.
APPLICATION FILED JUNE 7, 1912.
1,152,594.
Patented Sept. 7, 1915.
4 SHEETS—SHEET 4.
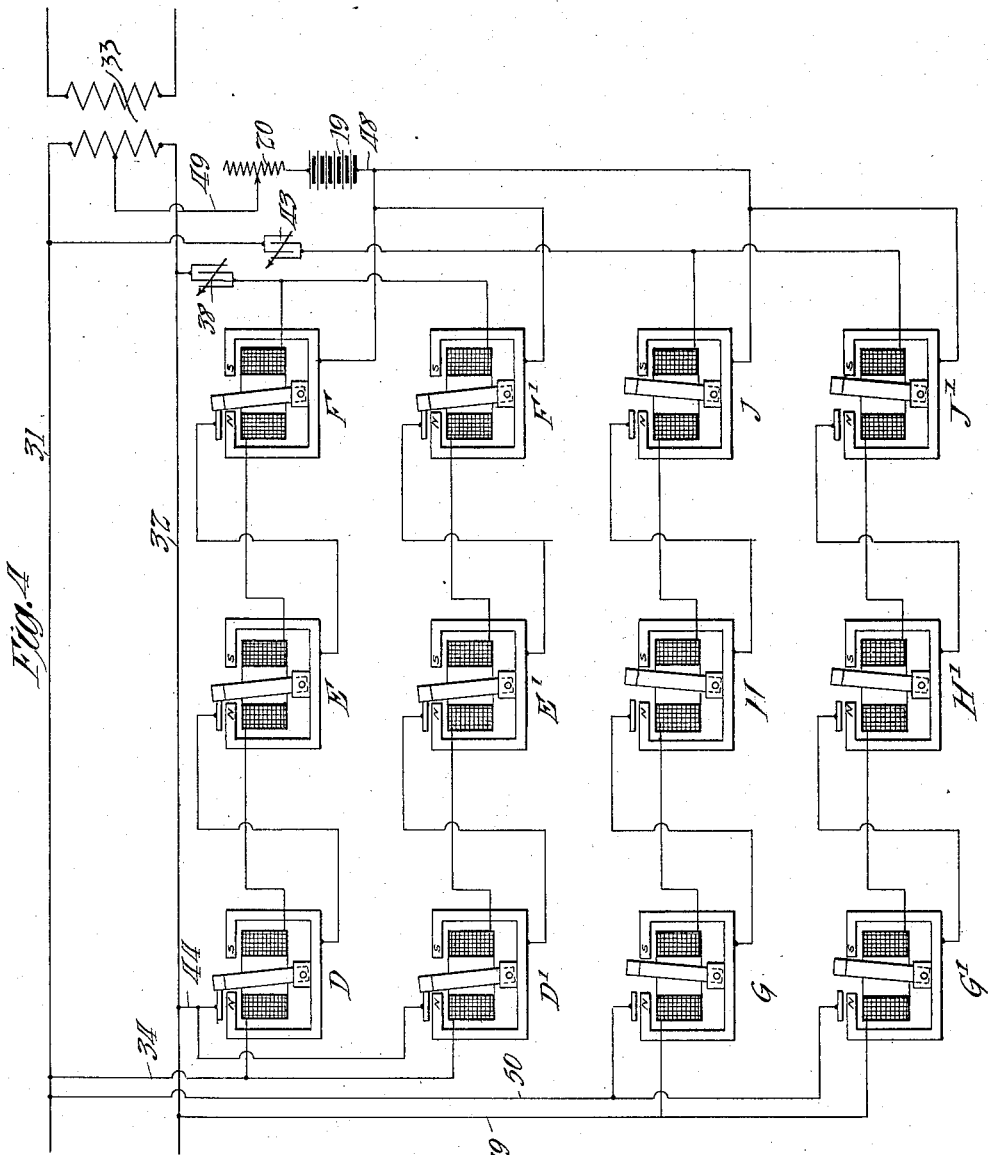
Witnesses:
Inventor:
Donald M. Bliss
By Frank L. Dyer
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT-RECTIFYING SYSTEM.

1,152,594. Specification of Letters Patent. Patented Sept. 7, 1915.

Application filed June 7, 1912. Serial No. 702,160.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current-Rectifying Systems, of which the following is a specification.

My invention relates to alternating current rectifying systems in which rectifying devices of the vibrating type are employed. The usefulness of rectifying devices of this type as constructed and used prior to my invention has been limited by the small current-carrying capacity of the same and by their inability to operate successfully on any but very low voltage circuits.

My invention has for its object the provision of a rectifying system adapted to operate efficiently to supply uni-directional currents of considerable volume and voltage, such for example, as are required in charging storage batteries used commercially for vehicle propulsion, ignition sets, and other purposes.

My invention consists in the use of a plurality of rectifiers having their rectifying circuits connected in series, whereby the voltage across each set of contacts is reduced and sparking is practically eliminated, and also in the use of a plurality of groups of such serially connected rectifiers, the groups being connected in parallel. In this manner I secure a large current carrying capacity without interfering with the sensitiveness of operation of the system, and my improved system is capable of successful and efficient operation on circuits of considerable voltage.

In the drawings which accompany and form a part of this specification—

Figures 1 to 4 inclusive are diagrammatic views of alternating current rectifying systems embodying my invention; and Fig. 5 is a cross-sectional view of a simplified form of the rectifying device which I prefer to use in my improved systems.

In the systems illustrated in Figs. 3 and 4, both half waves of alternating current are utilized, and in the systems illustrated in Figs. 1 and 2 only alternate half waves are utilized.

Referring particularly to Figs. 1 and 5, alternating current mains are shown at 1 and 2, which are supplied with alternating current from any suitable source, as for example, from the transformer 3. A plurality of rectifying devices A, B and C are provided, which are connected to the alternating current mains 1 and 2 in a manner more fully described hereinafter. Each of the rectifying devices preferably comprises a permanent magnet 4 having an almost completely closed magnetic circuit. In the gap between the north and south poles of the permanent magnet 4, armatures 5 and 6 are mounted, so as to be capable of vibration. The armatures 5 and 6 are provided at their upper ends with contacts which coöperate with the stationary contact 7. The armatures 5 and 6 and the contacts carried thereby are in electrical connection with each other and with the permanent magnet 4 or with a suitable supporting frame, or with both. An actuating coil 8 surrounds the armatures 5 and 6. The actuating coils of the rectifying devices A, B and C are connected to the alternating current mains in any suitable manner, as for example, in series and across the mains by means of the conductors 10, 11, 12 and 13. In this circuit and in series with the actuating coils is preferably placed an adjustable condenser 14. The rectifying circuits of the rectifiers are connected in series across the alternating current mains 1 and 2, as for example, in the following manner:—The stationary contact 7 of the rectifier A is connected to the alternating current main 2 by conductor 15. The vibratory contacts carried by the armatures 5 and 6 of the rectifier A are connected to the stationary contact of the rectifier B through the said armatures by a conductor 16. The vibrating contacts of the rectifier B are connected to the stationary contact of the rectifier C by the conductor 17, and the vibrating contacts of the rectifier C are connected by conductor 18 to a direct current translating device, such as a storage battery 19, and thence through an adjustable rheostat 20 to the other side 1 of the alternating current circuit.

The mode of operation of the system is as follows:—In each of the rectifying devices, reversals of current occur in the actuating coil 8 and an alternating flux is set up in the armatures 5 and 6, thereby making the upper ends of the armatures alternately north and south poles. Furthermore, when the upper ends of the armatures are of north polarity, the south pole of the permanent magnet is strengthened, and the north pole weakened, and when the upper ends of the armatures are of south polarity, the north pole of the permanent magnet is strengthened and the south pole is weakened. As a result, the armatures are vibrated in synchronism with the alternating current flowing through the coil 8, and the same action takes place in each of the rectifying devices A, B and C. When the vibrating contacts are in contact with the stationary contacts, a circuit is established from the alternating current main 2 through the conductor 15, stationary contact 7 and vibrating contacts of the rectifier A, conductor 16, to the stationary contact of the rectifier B, through the vibrating contacts of rectifier B, conductor 17 to the stationary contact of the rectifier C, through the vibrating contacts of rectifier C and conductor 18 to the storage battery or other direct current translating device 19, rheostat 20, to the other alternating current main 1. This condition of affairs continues during one half wave of the alternating current. During the succeeding half wave, the circuit is broken at the contacts of each of the rectifying devices A, B and C. In this manner, uni-directional current is supplied to the storage battery or other direct current translating device 19. The adjustable condenser 14 in series with the actuating coils is employed to advance the phase of the current in the coils in order to compensate for the inertia of the armatures, and to cause the circuit to be broken at the proper times to avoid sparking. The adjustable rheostat 20 is employed to regulate the current supplied to the direct current translating device.

In Fig. 2 I have illustrated a modified system in which two groups of rectifying devices A, B, C and A', B', C' are employed. The group A, B, C is connected in the same manner as the rectifying devices A, B, C in Fig. 1. The group of rectifying devices A', B', C' is also connected in the same manner as the group of rectifying devices A, B, C, and the parts denoted by the primed reference characters correspond to the parts denoted by the reference characters which are not primed. The serially connected actuating coils of the rectifying devices A, B, C are connected in parallel with the serially connected actuating coils of the rectifying devices A', B', C'. The serially connected rectifying circuits of the rectifying devices A, B, C are connected in parallel with the serially connected rectifying circuits of the rectifying devices A', B', C'.

Obviously, the number of rectifying devices connected in series may be increased to any desired extent, and the number of such serially connected groups connected in parallel may also be increased to any desired extent. As a concrete example, if I wish to rectify a current of thirty amperes on a 110 volt alternating circuit, I may employ three parallel connected groups of five serially connected rectifiers each. In this case the current carried by each group is 10 amperes and the voltage drop across the contacts in each rectifying device can never exceed 22 volts.

Referring particularly to Fig. 3, alternating current mains are shown at 31 and 32, which are supplied with alternating current from any suitable source, as for example, from the secondary of the transformer 33. Two groups of rectifying devices D, E and F and G, H and J, similar to the devices hereinbefore described, are provided, which are connected as follows:— The actuating coils of the devices D, E and F are connected in series across the alternating current mains 31 and 32 by means of conductor 34 connected to alternating current main 31 and to the left hand terminal of the actuating coil of device D; conductor 35 connecting the right hand terminal of the actuating coil of the device D to the left hand terminal of the actuating coil of the device E; conductor 36 connecting the right hand terminal of the actuating coil of the device E to the left hand terminal of the actuating coil of the device F; conductor 37 connecting the right hand terminal of the actuating coil of the device F to the other alternating current main 32. In this circuit, as for example, in conductor 37, is connected an adjustable condenser for the purpose hereinbefore described. The actuating coils of the devices G, H and J are also connected in series across the alternating current mains by the following means:—Conductor 39 connecting the alternating current main 32 and the left hand terminal of the actuating coil of the device G; conductor 40 connecting the right hand terminal of the actuating coil of the device G to the left hand terminal of the actuating coil of the device H; conductor 41 connecting the right hand terminal of the actuating coil of the device H to the left hand terminal of the actuating coil of the device J; conductor 42 connecting the right hand terminal of the actuating coil of the device J to the other alternating current main 31. In this circuit, as for example, in conductor 42, is connected an adjustable condenser for the purpose hereinbefore described. When the devices are connected in this manner, it will be observed that at any instant current is flowing in one direction through the actuating coils of the devices D, E and F, and in the opposite direction through the actuating coils of the devices G, H and J. The vibrating contacts of the devices D, E and F are therefore closed when the vibrating contacts of the devices G, H and J are opened, and vice versa. The rectifying circuits are as follows:—The stationary contact 7 of the device D is connected by conductor 44 in the alternating current main 32. The vibrating contacts of the device D are connected through the armatures and frame and by means of the conductor 45 to the stationary contact of the device E. The vibrating contacts of the device E are connected through the armatures and frame and by means of conductor 46 to the stationary contact of the device F. The vibrating contacts of the device F are connected through the armatures and frame and by means of conductors 47 and 48 to one terminal of a direct current translating device, such as the storage battery 19, the other terminal of the storage battery being connected to the middle point of the secondary of the transformer 32 by a conductor 49. A regulating rheostat 20 to control the supply of current to the storage battery 19 may be connected in the conductor 49. The rectifying circuits of the devices G, H and J are connected as follows:—The stationary contact of the device G is connected through a conductor 50 to the alternating current main 31. The vibrating contacts of the device G are connected through the armatures and frame and by means of conductor 51 to the stationary contact of the device H. The vibrating contacts of the device H are connected through the armatures and frame and by means of conductor 52 to stationary contact of the device J. The vibrating contacts of the device J are connected through the armatures and frame and by means of conductor 53 to conductor 48 leading to the terminal of the storage battery 19.

The operation of this system is briefly as follows:—Assuming that current tends to flow in the secondary of the transformer 33 from the main 32 toward the main 31, current will flow as follows: through conductor 49, regulating rheostat 20, storage battery 19, conductor 48, conductor 47, frame, armatures and contacts of the device F to conductor 46, frame, armatures and contacts of the device E to conductor 45, frame, armatures and contacts of the device D to conductor 44, and thence to the alternating current main 32 and the transformer. At this time the rectifying circuits of the devices G, H and J are all opened, and no current flows through them. A half wave later, the contacts of the devices D, E and F open their rectifying circuits, and the rectifying circuits of the devices G, H and J are closed, and current flows through these circuits as follows:—from the middle point of the secondary of the transformer to conductor 49, regulating rheostat 20, storage battery 19, conductor 48, conductor 53, frame, armatures and contacts of device J to conductor 52, frame, armatures and contacts of device H to conductor 51, frame, armatures and contacts of the device G to conductor 50, and thence to the alternating current main 31, back to the transformer. In this manner both half waves of alternating current are utilized to supply uni-directional current to the storage battery or other direct current translating device 19.

The system illustrated in Fig. 4 differs from that illustrated in Fig. 3 only in providing an additional group of rectifying devices D', E' and F', having both their actuating and rectifying circuits connected in parallel with the actuating and rectifying circuits respectively of the devices D, E, and F, and an additional group of rectifying devices G', H' and J' having their actuating and rectifying circuits connected in parallel with the rectifying and actuating circuits of the devices G, H and J respectively. As illustrated, when the rectifying circuits of the devices D, E and F, D', E' and F' are closed, the rectifying circuits of devices G, H and J, G', H' and J' are opened, and vice versa. The mode of operation of this system is similar to that of the system illustrated in Fig. 3, and the circuits may be easily traced by reference to the drawings.

In the systems illustrated in Figs. 3 and 4, the rectifying devices are identical as regards direction of winding of actuating coils and polarities of permanent magnets, as when connected as illustrated, the rectifying circuits of the devices D, E, F, D', E' and F' are closed when the rectifying circuits of the devices G, H, J, G', H' and J' are closed, and vice versa. This result may also be obtained by connecting corresponding ends of the actuating circuits to the same side of the alternating current mains, and having the actuating coils of the devices D, E, F, D', E' and F' wound oppositely to the actuating coils of the devices G, H, J, G', H' and J', or by having the polarities of the permanent magnets of the devices D, E, F, D', E' and F' arranged oppositely to the polarities of the permanent magnets of the devices G, H, J, G', H' and J'.

It will be apparent that in the systems illustrated in Figs. 1 and 3, I have provided a plurality of rectifiers with their rectifying circuits connected in series, and thereby reducing the different of potential across coöperating contacts when the contacts are opened, and in the systems illustrated in Figs. 2 and 4 I have in addition provided a plurality of independent paths for the rectified current.

My invention is not limited to systems employing the particular type of rectifying device described herein, but is applicable to other types of vibrating rectifiers.

Having now described my invention, what

I claim as new therein and desire to protect by Letters Patent is as follows:—

1. In an alternating current rectifying system, the combination of an alternating current circuit and a plurality of rectifying devices, each having fixed and movable contacts, the latter adapted to vibrate into and out of contact with the former, and an actuating coil for causing such vibration in synchronism with the current to be rectified, the actuating coils being connected to the alternating current circuit to cause said vibrating contacts to vibrate in phase with each other and the fixed and movable contacts being connected so as to provide a plurality of breaks in series during the operation of the devices, substantially as described.

2. In an alternating current rectifying system, the combination of an alternating current circuit and a plurality of vibratory rectifying devices, each having an actuating circuit and a rectifying circuit, the actuating circuits being connected to the alternating current mains to cause said vibratory devices to operate in phase with each other, and the rectifying circuits being connected in series, substantially as described.

3. In an alternating current rectifying system, the combination of an alternating current circuit, a direct current translating device, and a plurality of groups of vibratory rectifying devices, each device having an actuating circuit and a rectifying circuit, the actuating circuits being connected to the alternating current circuit and the rectifying circuits of each group being connected in series with each other, and with the direct current translating device, substantially as described.

4. In an alternating current rectifying system, the combination of an alternating current circuit and a plurality of groups of rectifying devices, each device having an actuating circuit and a rectifying circuit, the actuating circuits being connected to the alternating current circuit, the rectifying circuits of each group being connected in series, and the serially connected groups of rectifying circuits being connected in parallel, substantially as described.

5. In an alternating current rectifying system, the combination of an alternating current circuit and a plurality of rectifying devices, each having a fixed contact and movable contacts, the latter adapted to vibrate into and out of contact with the former, and an actuating coil for causing such vibration in synchronism with the current to be rectified, the actuating coils being connected in series to the alternating current circuit, and the contacts being connected so as to provide a plurality of breaks in series during the operations of the devices, substantially as described.

This specification signed and witnessed this 5th day of June, 1912.

DONALD M. BLISS.

Witnesses:
HENRY LANAHAN,
ANNA R. KLEHM.

Copies of this patent may be obtained for five cents each, by addressing the "Commissioner of Patents, Washington, D. C."